(12) United States Patent
Bradshaw

(10) Patent No.: US 9,745,134 B1
(45) Date of Patent: Aug. 29, 2017

(54) CONVEYOR BELT WITH ROWS OF ALTERNATING TYPES OF BARS

(71) Applicant: Agricultural Distributing, Inc., Woodland, CA (US)

(72) Inventor: Anthony J. Bradshaw, Woodland, CA (US)

(73) Assignee: AGRICULTURAL DISTRIBUTING, INC., Woodland, CA (US)

(*) Notice: Subject to any disclaimer, the term of this patent is extended or adjusted under 35 U.S.C. 154(b) by 0 days.

(21) Appl. No.: 15/277,904

(22) Filed: Sep. 27, 2016

(51) Int. Cl.
*B65G 17/06* (2006.01)
*B65G 17/44* (2006.01)

(52) U.S. Cl.
CPC ........... *B65G 17/063* (2013.01); *B65G 17/44* (2013.01)

(58) Field of Classification Search
CPC .... B65G 17/063; B65G 17/064; B65G 17/38; B65G 17/44
USPC ................................................ 198/848, 849
See application file for complete search history.

(56) References Cited

U.S. PATENT DOCUMENTS

| | | | |
|---|---|---|---|
| 2,776,045 A | 1/1957 | Heinrichs | |
| RE27,690 E | 7/1973 | Roinestad et al. | |
| 4,023,671 A * | 5/1977 | Kramer | F16G 3/08 198/699 |
| 4,276,980 A | 7/1981 | Oizumi | |
| 4,645,070 A * | 2/1987 | Homeier | B65G 17/066 198/831 |
| 4,754,872 A * | 7/1988 | Damkjaer | B65G 17/086 198/850 |
| 4,815,587 A * | 3/1989 | Musil | B65G 15/52 198/728 |
| 5,431,275 A * | 7/1995 | Faulkner | B65G 17/086 198/778 |
| 6,401,914 B1 * | 6/2002 | Greve | B65G 17/066 198/779 |
| 7,556,142 B2 * | 7/2009 | Stebnicki | B65G 17/40 198/777 |
| 8,302,765 B2 | 11/2012 | Lago | |
| 9,656,809 B1 * | 5/2017 | Bradshaw | B65G 17/063 |
| 2014/0367229 A1 * | 12/2014 | Mulder | A01D 17/10 198/848 |

* cited by examiner

*Primary Examiner* — Mark A Deuble
(74) *Attorney, Agent, or Firm* — R. Michael West

(57) ABSTRACT

A conveyor belt comprised of a plurality of two types of elongated bars, arranged in parallel, spaced relation. The first type of bar includes a plurality of transverse elements, extending perpendicularly from either side of the bar. The second type of bar is preferably cylindrical. The two types of bars are arranged in alternating fashion along the belt, with the ends of the elements from the first type of bar in predetermined spaced relation from the side of an adjacent second type of bar. The relative heights of the two types of bars may be varied, to define article conveying pockets of different sizes and depths. Rollers are provided within of the arcuate ends of belts driving and supporting the bars. The belt may be endless, or assembled from one or more belt segments. Two or more belts may be combined laterally, to increase the width of the conveyor belt.

20 Claims, 6 Drawing Sheets

CONVEYOR BELT WITH ROWS OF ALTERNATING TYPES OF BARS

BACKGROUND OF THE INVENTION

1. Field of the Invention

The invention relates generally to conveyor belts for transporting comestibles, products, and packages. More specifically, the invention pertains to a conveyor belt comprised of a plurality of two types of elongated bars arranged in parallel, spaced, and alternating relation, the first type having a plurality of transverse finger-like elements extending from either side thereof, and the second type being preferably right-circular cylindrical in cross-section.

2. Description of the Prior Art

The prior art relating to conveyor belts for transporting comestibles, raw materials, manufactured goods, and packages is well developed. Although the principal objective of a conveyor belt is to move articles from one place to another, other objectives such as sorting and cleaning operations are also routinely performed in the process of conveying the articles. Sometimes, the sorting and cleaning operations are carried out manually, by persons standing adjacent the belt and acting directly upon the articles. In other cases, automatic sorting and cleaning operations are performed at stations or within zones, where unattended apparatus is provided to process the articles as they pass by.

Some conveyor belts are made from a continuous run of material, or from joined segments of such material, to form a belt having the desired width and length. Other belts are assembled from individual modular components, linked or pinned together to form a belt of the required size.

However formed, a conveyor belt usually passes around two or more rollers, sprockets, pulleys, or wheels providing drive and support as the belt is translated. These conveyor belt drive and support mechanisms may also be configured to direct the belt downwardly, upwardly, around corners, and in spiral fashion. Controllers for the drive systems of belts have been programmed to make belts move continuously, intermittently, and to reciprocate, in forward and reverse directions.

Conveyor belts have been provided with flights or other surface features, to assist in capturing or retaining the articles being transported. In some applications, flights or belt surface features are necessary to contain the articles, as the belt is inclined. In other applications, modifications of this sort act to group or segregate the articles for downstream processing.

In some applications, it is necessary for the conveyor belts to have a solid or impenetrable surface, so the goods or material being transported will not fall through the belt. In other configurations, the conveyor belt is perforated or includes apertures, to allow debris or other objects of a predetermined size to fall therethrough. The perforations or apertures thereby provide either a cleaning function or a size sorting function, or both. Perforations are also useful to allow upflowing air or downflowing water to pass through the perforations and remove debris and dirt from the product stream. Belts may be inclined in strategic locations simply to transport objects to a higher or lower elevation. Or an inclined belt may be combined with active cleaning forces, such as the pneumatic or hydraulic elements mentioned above.

Conveyor belts have been manufactured from a variety of materials, including rubber, metal, and plastic. Rubber belts are useful in providing full support of articles, and generally exhibit a transport surface with a high coefficient of friction. Metal belts are very durable, and are able to transport abrasive and heavy articles through challenging environments that would destroy or deteriorate other belt materials. Plastic belts lend themselves well to the transport of food articles, and also have applications in chemically corrosive surroundings.

Exemplary of this prior art is U.S. Pat. No. 2,776,045, granted to Heinrichs, in which a Bar Conveyor is disclosed. This arrangement includes a plurality of spaced long bar members 12, bent at their ends to form hooks 13. Linking members 14 are engaged by hooks 13. A pair of opposing sprockets 10 is provided, having teeth and notches between them, in which the ends of member 12 rest. This construction provides means for adjusting the spacing between the bars, and claims the conveyor is useful in movable "ore dressing grizzlies" and vegetable digging machines.

A Flat Wire Conveyor Belt Having Slotted Bar Links is shown in U.S. Reissue Pat. No. Re. 27,690, issued to Roinestad et al. This construction employs a plurality of transversely disposed tractive links 12, and a plurality of pivotal tractive cross pins 14. At each side of the conveyor belt 10, are bar links 16 provided with slots 26. The bar links carry substantially the entire tractive load of the belt as it travels around lateral curves, to eliminate deformation of the belt elements and eventual mechanical failure.

U.S. Pat. No. 8,302,765, issued to Lago, discloses a Bar Conveyor Belt, Particularly For The Food Industry. Lago uses two parallel longitudinal chains 6 and a plurality of bars 2 forming the conveying surface. The ends of the bars are fixed at their ends to successive links 4 of the two chains 6. Each link 4 comprises a U-shaped metal plate, having an inner arm 16, an outer arm 18, and an appendix 22. A drive sprocket 24 has teeth which engage the recess formed between two of the appendices 22 to drive the belt forwardly.

In U.S. Pat. No. 4,276,980, granted to Oizumi, a Conveyor Belt For [A] Conveyor System is illustrated. This belt uses a plurality of support bars 36, arranged side-to-side, each having a plurality of branch bars 42 and 44 which project from opposing sides of a support bar 36. The branch bars 42 and 44 include bores 46 and 48, through which connecting rods 38 extend. Because branch bars 42 and 44 of respective support bars 36 are inter-engaged, the bars merely shift relative to each other when going around lateral corners, and articles are prevented from falling through the relatively small apertures 50 between the elements and structure of bars 36.

However, the need exists for a bar belt conveyor with rows of alternating bars of different types, that can provide article conveying pockets of varying size and depth.

The need also exists for a bar belt conveyor which can be field modified to convey articles of different sizes and shapes.

The need also exists for a bar belt conveyor that includes article conveying bars which can easily be replaced with modular replacement bars quickly and with very little disassembly of the main conveyor components.

The need further exists for a bar belt conveyor which can perform debris removal and article size sorting by selecting bars having extending elements of predetermined spacing and length.

These and other objects will be disclosed in the written specification and drawings to follow.

SUMMARY OF THE INVENTION

The conveyor belt disclosed herein comprises a plurality of two types of modular, elongated bars arranged in parallel, spaced relation. The ends of each bar are connected to parallel, lateral, flexible belts, provided to support the bars and to maintain their registration with respect to each other.

A first type of bar, termed a finger bar, has a plurality of transverse elements, extending perpendicularly from either side of the rigid bar. The finger-like elements on either side may be collinear or offset in relation. The elements may extend across the bottom of the bar, extend from either side of the bar, or they may extend across the top of the bar.

A second type of rigid bar, termed an intermediate bar, has no protruding elements, or other features on its outer surface. It is preferably right-circular cylindrical in cross-section, but other configurations would work as well, including oval or faceted surfaces.

The first type of bar and the second type of bar are arranged in alternating fashion along the longitudinal extent of conveyor belt. The ends of the elements extending from one side of the first type of bar are spaced a predetermined distance from the side of an adjacent bar of the second type. Likewise, the end of elements extending from the other side of the bar of the first type are spaced from another adjacent bar of the second type.

The relative heights and spacing of the two types of bars may be varied, to define article conveying pockets of different sizes and depths. These article conveying pockets act to confine and positively transport articles of the desired size and configuration, and to allow downward passage of debris and articles not meeting the desired predetermined size and shape parameters.

Rollers are provided within of the arcuate ends of the two flexible belts driving and supporting the conveyor belt. Intermediate rollers may also be used, between the end rollers. At least one of the rollers is driven, and the rollers may include peripheral features to engage complementary features of the conveyor belt to provide positive engagement between the two.

The belt may be endless, or it may be assembled from one or more separate belt segments to form a belt of the desired length. Two or more conveyor belts may be combined laterally, to increase the width of the conveyor belt as needed.

DETAILED DESCRIPTION OF THE PREFERRED EMBODIMENT

Figures 1, 2A, 2B:
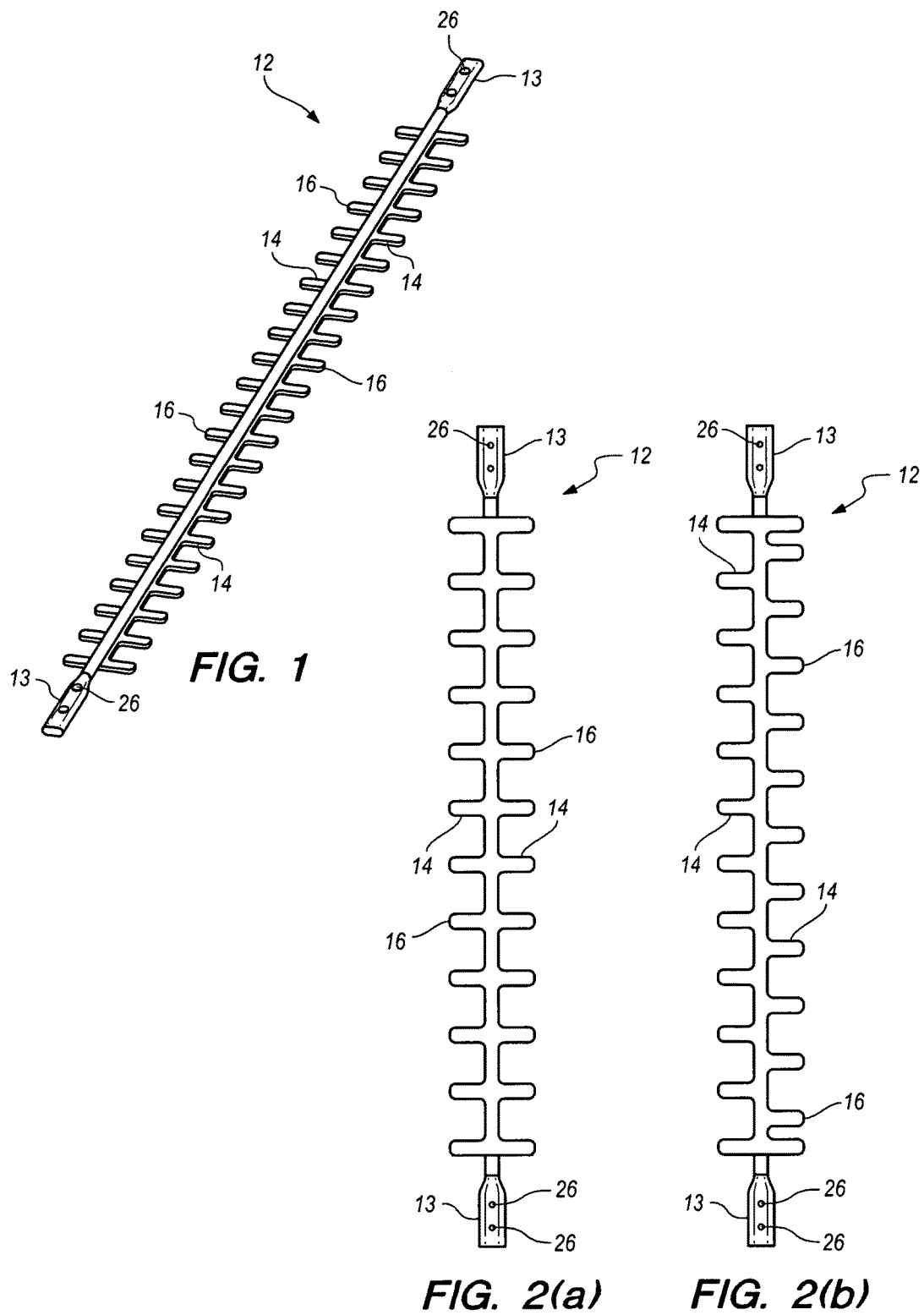
FIG. 1 is a left front perspective view of the first type of bar, a finger bar with transverse elements.
FIG. 2(a) is a bottom plan view of a finger bar with the transverse elements extending across the bottom of the bar.
FIG. 2(b) is a bottom plan view of a finger bar as shown in FIG. 2(a), but with the transverse elements arranged in offset relation, on either side of the bar.

Turning now to the drawings, the conveyor belt 11 disclosed herein comprises a plurality of two types of rigid, elongated bars arranged in parallel, spaced relation. A first type of bar, termed a finger bar 12, has opposing ends 13 and a plurality of co-planar transverse elements 14 of a predetermined length, therebetween. The finger-like transverse elements 14 extend perpendicularly from the finger bar 12 to respective element ends 16, and they are arranged in spaced relation a predetermined distance from each other along both sides of finger bar 12. The predetermined distance between adjacent transverse elements 14, is selected to be smaller than any dimension of an article 17 to be transported on conveyor belt 11.

As will become more apparent below, this predetermined distance may also be used advantageously to perform both sizing and cleaning functions, for either undersized articles 17 or debris 18 which is to be removed from the article stream. The transverse elements 14 on either side may be collinear, as in FIGS. 1 and 2(a), or arranged in offset relation as illustrated in FIG. 2(b). Offset relation of the transverse elements 14 may be used, for example, where the articles 17 are to be conveyed laterally offset from each other, to facilitate downstream sorting, processing, or packaging operations.

Figure 3:
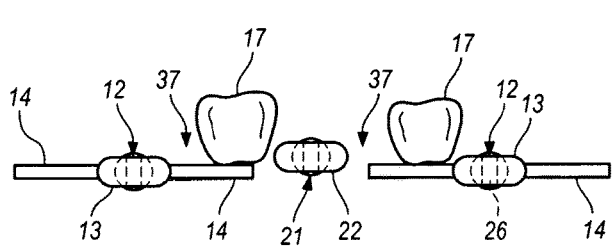
FIG. 3 is an end elevational view showing two finger bars and a raised intermediate bar, the elements extending from either side of the finger bars.
Figure 4:
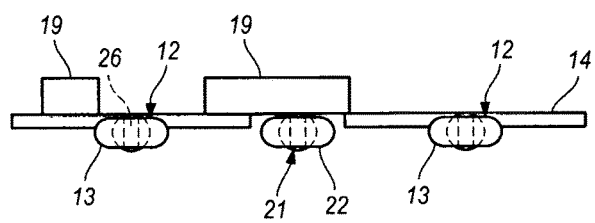
FIG. 4 is an end elevational view showing two finger bars and an intermediate bar, the elements extending across the top of the finger bars.
Figure 5:
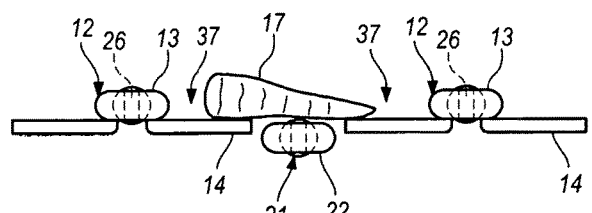
FIG. 5 is an end elevational view showing two finger bars and a lowered intermediate bar, the elements extending across the bottom of the finger bars, as in FIGS. 2(a) and 2(b)

As shown respectively in FIGS. 3, 4, and 5, the transverse elements 14 may extend from either side of the finger bar 12, across the top of the bar 12, or they may extend may extend across the bottom of the bar 12. Each of these configurations has uses for carrying an article 17 of a particular type, shape, and size to be transported. Specifically, in the case of FIG. 4, a configuration is shown that is well adapted for transporting packages 19 of varying sizes. Thus, the arrangement shown in FIG. 4 and elaborated upon in FIG. 10, would be useful in a product manufacturing setting or where parcels are being sorted or processed.

Figure 6:
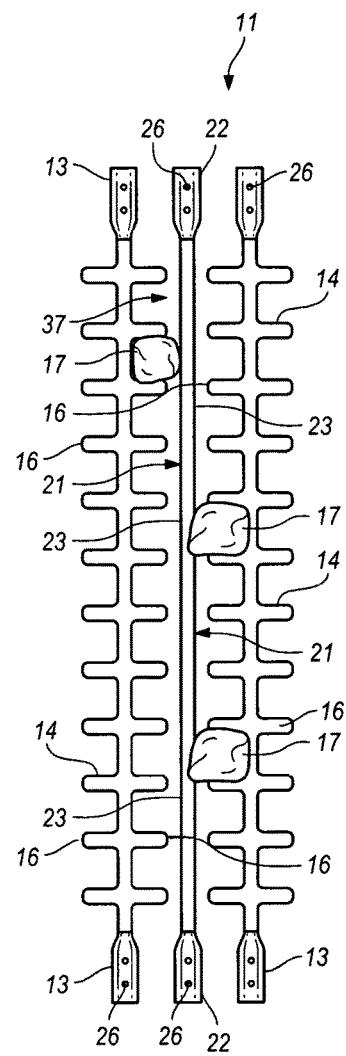
FIG. 6 is a top plan view of the type of finger bar shown in FIG. 2(a) illustrating the spaced relation between the intermediate bar and the tips of the transverse elements.

In FIG. 3, two finger bars 12 are shown in combination with a second type of bar, termed an intermediate bar 21. Intermediate bar 21 is elongated, as are finger bars 12, but it has no protruding elements, or other such features on its outer surface. Intermediate bar 21 is preferably right-circular cylindrical in cross-section, but other configurations would work as well, including shapes which are oval, square, rectangular, hexagonal, or octagonal in cross-section. Intermediate bar 21 also has ends 22 and opposing sides 23, as shown in FIG. 6.

Figure 7:
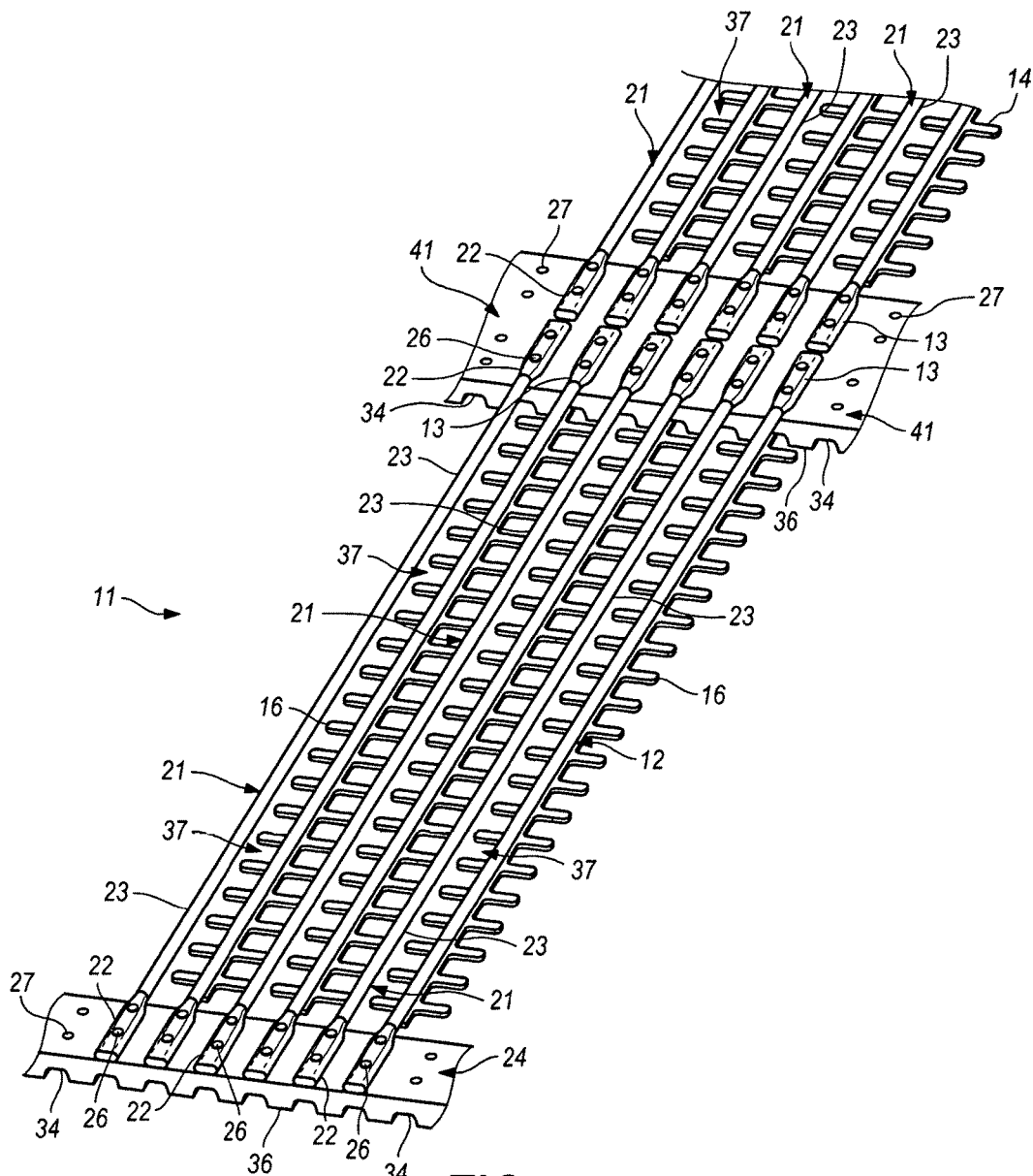
FIG. 7 is a fragmentary perspective view of an upper run of a conveyor belt, showing a plurality of the two types of bars assembled with one lateral belt and an intermediate belt, to make a wider belt.
Figure 8:
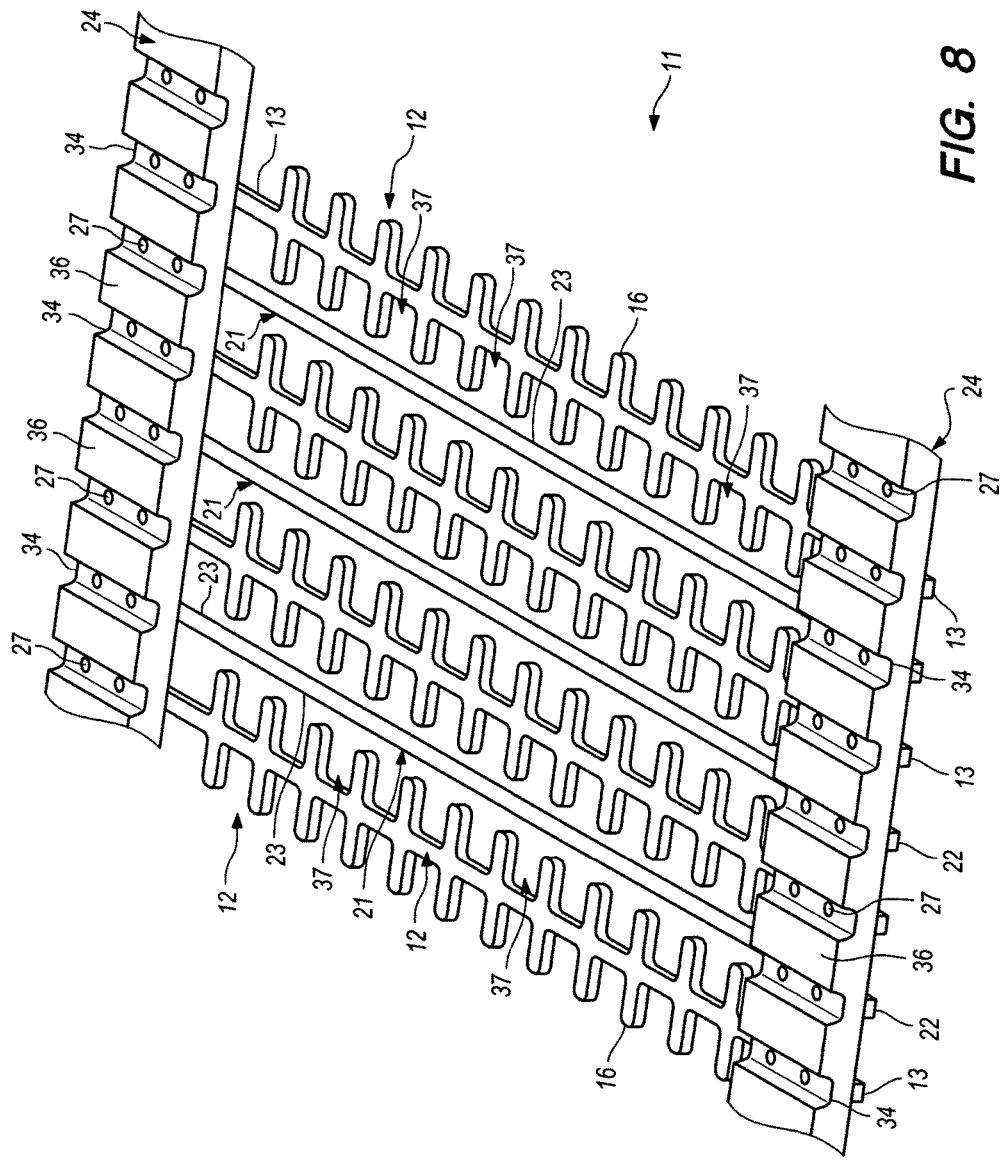
FIG. 8 is a fragmentary perspective view of a lower run of a conveyor belt, showing intermediate bars in combination with finger bars having elements extending across the top of the finger bars.
Figure 9:
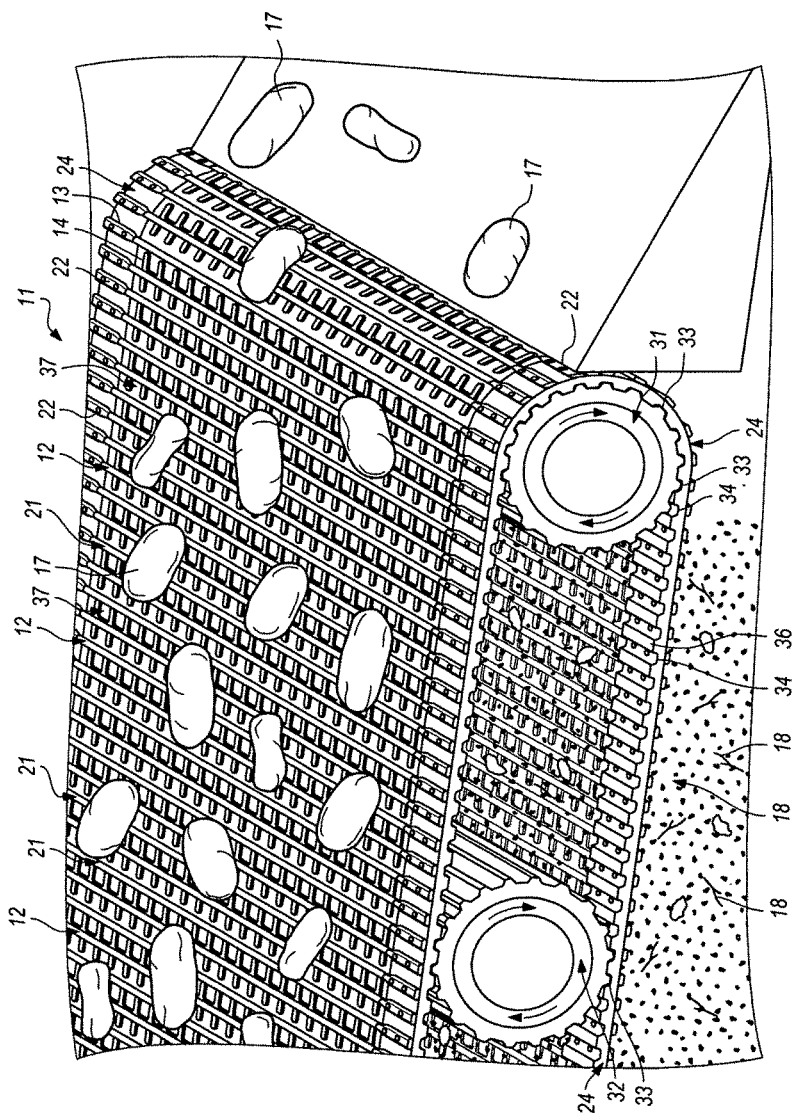
FIG. 9 is a fragmentary perspective view of a segment of upper and lower runs of a conveyor belt, showing comestibles being transported thereon, with debris falling therethrough; and, FIG. 10 is a side elevational view of a conveyor segment, showing packaged goods being transported from one inclined ramp to another inclined ramp.

Finger bars 12 and intermediate bars 21 are arranged in parallel relation, in successive alternating fashion along a longitudinal extent of the conveyor belt 11, as shown in FIGS. 7, 8 and 9. Element ends 16 of transverse elements 14 extending from one side of a finger bar 12, are spaced a predetermined distance from one opposing side 23 of an adjacent intermediate bar 21. Element ends 16 of transverse elements 14 extending from the other side of finger bar 12, are spaced the same predetermined distance from one opposing side 23 of another adjacent intermediate bar 21.

The ends of 13 of finger bars 12 and the ends 22 of intermediate bars 21, are connected to parallel, lateral, flexible belts 24 by means of connectors (not shown) passed through bores 26 in ends 13 and 22. The connectors also pass through apertures 27 in lateral belts 24. Belts 24 are provided to support the finger bars 12 and the intermediate bars 21, and to maintain their registration with respect to each other. Lateral belts may be endless or they may be comprised of belt segments which are connected together to form belts of the desired length for conveyor belt 11.

Figure 10:
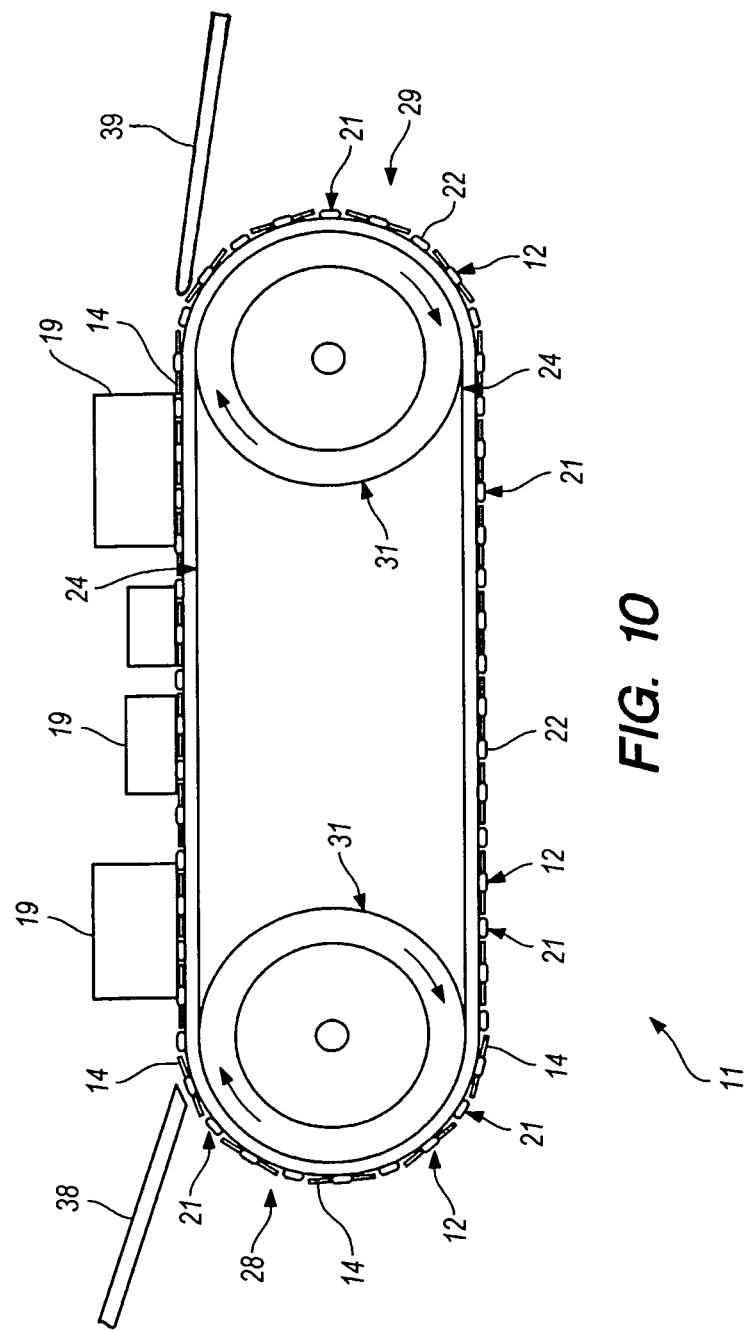

Lateral belts 24 have arcuate end portions 28 and 29, as shown in FIG. 10. A rotatable end roller 31 is provided within each of the arcuate end portions 28 and 29, for supporting the conveyor belt 11. One or more intermediate rollers 32 may also be provided between the upper run and the lower run of the conveyor belt 11 and between end rollers 31, for additional support. At least one of the rollers 31 or 32 is driven, to translate the conveyor belt 11 in the desired fashion.

The end rollers 31 and the intermediate roller 32 may include peripheral features to engage complementary features in contingent portions of the lateral belts 24. For example, the rollers 31 and 32 may include teeth 33, and the lateral belts 24 may include recesses 34. Lands 36 are evident between the recesses 34, in FIG. 8. The combination of teeth 33 and recesses 34 provides positive engagement between the rollers 31 and 32 and the lateral belts 24. Alternatively, rollers 31 may simply be provided with a smooth outer periphery, and lateral belts 24 may also present a smooth inner surface, so that frictional engagement is provided between the two surfaces. (See, FIG. 10).

It should be noted that in FIG. 3, the intermediate bar 21 is raised slightly, with respect to the finger bars 12. This is readily accomplished either by adding spacers underneath the bar ends 22 where they attach to lateral belts 24, or alternatively by appropriately bending the portion where the bar ends 22 meet the main body of intermediate bar 21. This example points out that the relative heights and the spacing of the two types of bars 12 and 21 may be varied, as well as the predetermined lengths of elements 14. These parameters are selected to define article conveying pockets 37 of different sizes, configurations, and depths.

These article conveying pockets 37 act to confine and positively transport articles 17 of the desired size and configuration. This is evident in FIG. 3, where the articles 17 are nuts or fruit, smaller than the article conveying pockets 37. The article conveying pockets 37 also allow downward passage of debris 18, and in some cases articles 17 not meeting the desired predetermined size and shape parameters. In the example shown FIG. 9, the articles 17 are potatoes which are much larger than the article conveying pockets 37; no article 17 size sorting function is performed in this example. However, unwanted debris 18 is still able to pass through the pockets 37 so it is effectively removed from the article stream.

In yet another example, shown in FIGS. 4 and 10, the upper surfaces of the two bars 12 and 21 lie in the same plane, so packages 19 of different sizes may be transported. Packages 19 slide by gravity down inlet ramp 38, are transported by the conveyor belt 11, and then deposited onto the outlet ramp 39. Article conveying pockets 37 are not necessary in this example, as the packages 19 are of different sizes, and it is desirable that the upper surface of the conveyor belt 11 presents a smooth, planar surface for package conveyance.

FIG. 5 shows yet another arrangement for the conveyor belt 11, where the upper surface of the intermediate bar 21 lies in the same plane as the upper surface of the transverse elements 14. This creates a relatively large article conveying pocket 37, extending from the main body of one finger bar 12 to the main body of an adjacent finger bar 12. In this example, a carrot is the article 17 lying between the two bars 12.

A need may arise for a conveyor belt 11 of greater width than that provided by the length of the finger bar 12 and the intermediate bar 21. In that case, an intermediate belt 41 is provided mid-way, between the first and second lateral belts 24, and parallel thereto. This example is shown in FIG. 7. This arrangement employs the same means of attachment, as the bar ends 13 and the bar ends 22 are connected with fasteners to the upper side of intermediate belt 41. The lower side of intermediate belt 41 is also provided with recesses 34 and lands 36, identical to those on lateral belts 24. In that manner, the teeth on end rollers 31 and on intermediate roller 32 may positively engage recesses 34 on intermediate belt 41 as well.

What is claimed is:

1. A conveyor belt comprising:
   a. a plurality of elongated finger bars, each of said finger bars having ends and a plurality of co-planar transverse elements of a predetermined length therebetween, said transverse elements extending perpendicularly from said finger bar to respective element ends, and being arranged in spaced relation a predetermined distance from each other along both sides of said finger bar;
   b. a plurality of elongated intermediate bars, each of said intermediate bars having ends and opposing sides, said finger bars and said intermediate bars being arranged in parallel relation in successive alternating fashion along a longitudinal extent of the conveyor belt, said ends of elements extending from one side of a finger bar being spaced a predetermined distance from one side of one adjacent intermediate bar, and said ends of elements extending from the other side of said finger bar being spaced the same predetermined distance from one side of another adjacent intermediate bar; and,
   c. a pair of parallel lateral belts, said ends of said finger bars and said ends of said intermediate bars being attached to a respective said lateral belt, said lateral belts supporting and driving said finger bars and said intermediate bars and any articles carried by the conveyor belt.

2. A conveyor belt as in claim 1 in which said lateral belts are endless and have arcuate end portions, and in which an end roller is provided within each of said arcuate end portions for supporting the conveyor belt, at least one of said end rollers being driven.

3. A conveyor belt as in claim 2 in which said end rollers include peripheral features to engage complementary features in contingent portions of the lateral belts to provide positive engagement between said rollers and said lateral belts.

4. A conveyor belt as in claim 1 in which respective said elements on both sides of said finger bar are either collinear or offset in relation.

5. A conveyor belt as in claim 1 in which said elements extend across a bottom portion of the finger bar, or extend from a median portion of said finger bar, or extend across a top portion of said finger bar.

6. A conveyor belt as in claim 1 in which said predetermined length of said elements, said predetermined spacing between said elements, and said predetermined distance between said ends of said elements and said intermediate bar, are selected to define an article conveying pocket of a particular size, configuration, and depth.

7. A conveyor belt as in claim 1 in which a cross-section of said intermediate bar is right-circular cylindrical, oval, square, rectangular, hexagonal, or octagonal.

8. A conveyor belt comprising:
   a. a plurality of elongated finger bars, each of said finger bars having ends and a plurality of co-planar transverse elements of a predetermined length therebetween, said transverse elements extending perpendicularly from said finger bar to respective element ends, and being arranged in spaced relation a predetermined distance from each other along both sides of said finger bar, opposing respective elements being in collinear relation;
   b. a plurality of elongated intermediate bars, each of said intermediate bars having ends and opposing sides, said finger bars and said intermediate bars being arranged in parallel relation in successive alternating fashion along a longitudinal extent of the conveyor belt, said ends of elements extending from one side of a finger bar being spaced a predetermined distance from one side of one adjacent intermediate bar, and said ends of elements extending from the other side of said finger bar being spaced the same predetermined distance from one side of another adjacent intermediate bar;
   c. a pair of parallel, endless, lateral belts, said ends of said finger bars and said ends of said intermediate bars being attached to a respective said lateral belt, said lateral belts supporting and driving said finger bars and said intermediate bars and any articles carried by the conveyor belt, said lateral belts having arcuate end portions at the ends of the longitudinal extent of the conveyor belt; and,
   d. an end roller within each of said arcuate end portions for driving and supporting the conveyor belt.

9. A conveyor belt as in claim 8, in which at least one intermediate roller is located between an upper run of the conveyor belt and a lower run of the conveyor belt and between said end rollers, for support of an intermediate portion of the conveyor belt.

10. A conveyor belt as in claim 8 in which said end rollers include peripheral features which engage complementary features on a lower side of said lateral belts.

11. A conveyor belt as in claim 10 in which said peripheral features on said end rollers comprise a plurality of teeth, and in which said complementary features on said lateral belts comprise recesses sized and configured to accommodate said teeth.

12. A conveyor belt as in claim 8 in which respective said elements on both sides of said finger bar are either collinear or offset in relation.

13. A conveyor belt as in claim 8 in which said elements extend across a bottom portion of the finger bar, or extend from a median portion of said finger bar, or extend across a top portion of said finger bar.

14. A conveyor belt as in claim 8 in which said predetermined length of said elements, said predetermined spacing between said elements, and said predetermined distance between said ends of said elements and said intermediate bar, are selected to define an article conveying pocket of a particular size, configuration, and depth.

15. A conveyor belt as in claim 8 in which a cross-section of said intermediate bar is right-circular cylindrical, oval, square, rectangular, hexagonal, or octagonal.

16. A conveyor belt, comprising:
   a. a first lateral belt and a second lateral belt, said first and second lateral belts being opposing and parallel, and spaced from each other to define a conveyor belt width;
   b. an intermediate belt, said intermediate belt being located mid-way between said first and second lateral belts, and parallel thereto;
   c. a plurality of elongated finger bars, each of said finger bars having ends and a plurality of co-planar transverse elements of a predetermined length therebetween, said transverse elements extending perpendicularly from said finger bar to respective element ends, and being arranged in spaced relation a predetermined distance from each other along both sides of said finger bar with respective elements on opposing sides of said finger bar being in collinear relation;
   d. a plurality of elongated intermediate bars, each of said intermediate bars having ends and opposing sides, said finger bars and said intermediate bars being arranged in parallel spaced relation in successive alternating fashion along a longitudinal extent of the conveyor belt, said ends of said finger bars and said ends of said intermediate bars being attached to a respective said lateral belt and said intermediate belt, said lateral belts and said intermediate belt supporting and driving said finger bars and said intermediate bars and any articles carried by the conveyor belt, said lateral belts and said intermediate belt having arcuate end portions at the ends of the longitudinal extent of the conveyor belt; and,
   d. an end roller within each of said arcuate end portions for driving and supporting the conveyor belt.

17. A conveyor belt as in claim 16 in which said ends of elements extending from one side of a finger bar are spaced a predetermined distance from one side of one adjacent intermediate bar, and said ends of elements extending from the other side of said finger bar are spaced the same predetermined distance from one side of another adjacent intermediate bar.

18. A conveyor belt as in claim 17 in which said predetermined length of said elements, said predetermined spacing between said elements, and said predetermined distance between said ends of said elements and said intermediate bar, are selected to define an article conveying pocket of a particular size, configuration, and depth.

19. A conveyor belt as in claim 16 in which said elements extend across a bottom portion of the finger bar, or extend from a median portion of said finger bar, or extend across a top portion of said finger bar.

20. A conveyor belt as in claim 16 in which a cross-section of said intermediate bar is right-circular cylindrical, oval, square, rectangular, hexagonal, or octagonal.

* * * * *